United States Patent Office 3,759,688
Patented Sept. 18, 1973

3,759,688
METHOD FOR DEFOLIATING COTTON PLANTS USING PHOSPHATE ESTERS OF 3-HYDROXY-1,2,5 - THIADIAZOLES AND DERIVATIVES THEREOF
Charles Downing, Metuchen, N.J., assignor to Mobil Oil Corporation
No Drawing. Filed Sept. 27, 1971, Ser. No. 184,186
Int. Cl. A01n 9/22
U.S. Cl. 71—71                                2 Claims

ABSTRACT OF THE DISCLOSURE

Phosphate, phosphorothionate, phosphonate and phosphonothionate esters of 3-hydroxy-1,2,5-thiadiazoles and its substituted derivatives are desiccant defoliants for cotton when applied thereto.

CROSS-REFERENCE TO RELATED APPLICATION

Copending application Ser. No. 813,270 filed Apr. 3, 1969 describes and claims these compounds as new compounds useful as insecticides.

BACKGROUND OF THE INVENTION

Field of the invention

This invention is concerned with the defoliation of cotton with phosphorus esters of 3-hydroxy-1,2,5-thiadiazoles.

Description of the prior art

Phosphorus esters of 3-hydroxy-1,2,5-thiadiazoles have been disclosed as insecticides. For example, in Belgian Pat. No. 748,258 and South African Pats. Nos. 68/2333 and 68/7628. These patents, however, do not disclose the desiccant defoliation activity of these compounds.

SUMMARY OF THE INVENTION

The present invention provides a method for defoliating cotton plants which comprises applying thereto, in an amount sufficient to effect defoliation a compound having the formula:

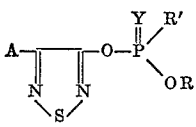

wherein Y is oxygen or sulfur, R is hydrogen, alkyl ($C_1$–$C_5$), alkenyl ($C_2$–$C_6$), cycloalkyl ($C_3$–$C_6$), aryl, haloalkyl ($C_1$–$C_5$), haloalkenyl ($C_2$–$C_6$), or haloaryl, R' is alkyl ($C_1$–$C_5$), or alkoxy ($C_1$–$C_5$), and A is R, dialkylamino, nitro, halogen, alkoxycarbonyl, acyl, alkoxy, alkylthio, alkylsulfonyl, thiocyano, or cyano.

DESCRIPTION OF SPECIFIC EMBODIMENTS

On normal cotton plants which are not treated with defoliating agents, the bolls on the lower branches open first while the bolls on the upper branches continue to open slowly over a period of as long as two months from the time when picking of the lower bolls is desirable. The majority of the leaves remain attached to the plant and cause green stains on the cotton when mechanical cotton pickers are employed. In addition, the leaves high on the plant shade the lower bolls from sunlight and air resulting in excessive boll rot. At times, 15% of the cotton crop has been lost because of this boll rot. Without the use of defoliating agents, numerous hand pickings are necessary to prevent boll rot and staining.

It is the discovery of this invention that the foliage of cotton plants can be treated with many types of hereindescribed phosphorus compounds with the result that the leaves are shed.

The amount of defoliant to be applied will depend upon the kind of vegetation to be defoliated and the density thereof, as well as the choice of defoliant compound. The compounds have been found to be effective when applied to normal cotton stands at rates varying from 1.00 to 10 lbs. per acre, but it is to be understood that these figures do not represent either maximum or minimum limits.

The defoliant is applied to cotton usually when the bolls are from 35 to 40 days old, but this may vary with the season and climate.

Improved, very efficient defoliant compositions are obtained when oil-in-water emulsions of solutions of compounds in oil are prepared. The word "oil" is used here to designate any liquid which is a solvent for the compounds of this invention and is insoluble in water, such as xylene, kerosene, diesel oil, benzene, carbon tetrachloride, ether, heptane, heavy mineral oils, and water insoluble solutions of water-soluble liquids in water-insoluble liquids such as a solution of ethyl alcohol in kerosene. The emulsions may be obtained by first dissolving the defoliant in the oil and then mixing the resulting solution with water in the presence of an emulsifying agent. In actual commercial sale and application, the defoliant compounds are dissolved in the oil solvent and the emulsifier is added to the solution. In the field this mixture of active ingredient, oil and emulsifier is mixed with water before actual application to the cotton plant. Any of the many methods of spray application may be employed.

Emulsifying agents customarily used in the art for the preparation of oil-in-water emulsions are operable in the practice of this invention, e.g., ionic or non-ionic emulsifying or dispersing agents such as the long-chain alkylbenzene-sulfonates or polyglycol ethers. Such emulsifying agents are normally employed in only very small concentrations, for example, in a quantity up to about 0.3% by weight based on the weight of the emulsion. However, it is possible to use any amount of emulsifying agent up to a quantity which would be detrimental to the cotton plant. Some emulsifiers show phytotoxic reactions when used on living plants. Concentrations of emulsifier up to about 5% by weight do not normally damage healthy cotton plants. Such emulsifiers do not affect the chemical stability or defoliating activity of the phosphorothioites.

While the compounds are advantageously used as defoliants when formulated into oil-in-water emulsions, they may also be dissolved in organic solvents or so-called oils as mentioned above, and such solutions applied directly onto the cotton plants. In formulations such as the latter a wetting agent is sometimes required. They may also be mixed with solid carriers such as clay, talc, pumice, and bentonite and then dusted onto the cotton plants. The compounds may also be mixed and applied with liquid or solid agricultural pesticides such as insecticides and/or fungicides. While all of these methods of application are operable, the oil-in-water emulsions and the solutions of the compounds in oil are preferred. The emulsions tend to adhere easily to the plant foliage and are very readily applied by conventional spray methods. The preferred methods of application require less of the active ingredient to give comparable defoliant efficiency than do any of the other methods of application referred to above.

The compounds used in the method of this invention are readily prepared by reacting an alkali metal (Na, K, Li) salt of 3-hydroxy-1,2,5-thiadiazole or a 4-substituted (A as aforedefined) derivative thereof with a phosphorochloridate or phosphonochloridate, or phosphorochloridothionate, or phosphonochloridothionate ester with the desired R and R' substituents as aforedefined.

The 3-hydroxy-1,2,5-thiadiazole and its derivatives are prepared by the methods of Weinstock et al., J. Org. Chem., 32, 2823 (1967) and of the references cited therein. In general, the authors state:

"We have found that the methods of formation of this aromatic ring system by cyclization reactions encompass several classes of acyclic compounds and that a general model for the structure of aliphatic systems suitable for 1,2,5-thiadiazole syntheses can be devised. This model is defined in terms of an acyclic NCCN grouping in which the N—C functions are varied over the oxidation levels of amine, imine, cyanide, and oxime. Aliphatic compounds which contain these functionalities in any combination react with sulfur monochloride or, in some cases, sulfur dichloride to form an appropriately substituted 1,2,5-thiadiazole.

"Based on this model, a large number of readily available acyclic compounds can be constructed which serve as starting materials in these syntheses, e.g., α-diamines, α-aminonitriles, alkyl cyanoformimidates, α-amino acid amides, α-aminoamidines, dialkyl oxalimidates, alkyl oxaminimidates, α-dioximes, α-isonitrosoamides, and α-isonitrosonitriles. The data now at hand indicate that, with few exceptions, the reactions of these classes of compounds are general over a range of substituents. In addition, two unique starting materials, cyanogen and 1-cyanoformamide, are based on the model described above. The various acyclic compounds employed in these reactions and the derived 1,2,5-thiadiazoles are summarized in Table I.

"The yields in these reactions range from about 30 to 90%, depending on the nature of the starting material. The reactions proceed readily at room temperature except in the case of the α-diamine hydrochlorides where slightly elevated temperatures are employed. Since most of the products are volatile, they are readily obtained in a state of high purity by steam distillation of the reaction mixture. The nonvolatile products (hydroxy and amino derivatives) are isolated by ether extraction of the water-quenched reaction mixture. Dimethylformamide is the solvent of choice and generally a 100% M excess of sulfur monochloride is employed. The stoichiometry of sulfur monochloride is calculated as 1 mole equiv for insertion of the ring sulfur plus 1 mole equiv for each degree of oxidation required to obtain the aromatic form of the ring."

Non-limiting examples of the phosphate, phosphonate, phosphorothionate, and phosphonothionate esters utilizable in this invention are:

dimethyl 1,2,5-thiadiazol-3-yl phosphate
diethyl 1,2,5-thiadiazol-3-yl phosphate
dimethyl 1,2,5-thiadiazol-3-yl phosphorothionate
diethyl 1,2,5-thiadiazol-3-yl phosphorothionate
dimethyl 4-ethoxy-1,2,5-thiadiazol-3-yl phosphate
diethyl 4-ethoxy-1,2,5-thiadiazol-3-yl phosphate
diethyl 4-ethoxy-1,2,5-thiadiazol-3-yl phosphorothionate
dimethyl 4-chloro-1,2,5-thiadiazol-3-yl phosphate
diethyl 4-chloro-1,2,5-thiadiazol-3-yl phosphate
dimethyl 4-ethylthio-1,2,5-thiadiazol-3-yl phosphate
diethyl 4-ethylthio-1,2,5-thiadiazol-3-yl phosphate
dimethyl 4-ethylthio-1,2,5-thiadiazol-3-yl phosphorothionate
diethyl 4-ethylthio-1,2,5-thiadiazol-3-yl phosphorothionate
diethyl 4-cyano-1,2,5-thiadiazol-3-yl phosphate
diallyl 1,2,5-thiadiazol-3-yl phosphate
dicyclohexyl 1,2,5-thiadiazol-3-yl phosphate
di(bromopropyl) 1,2,5-thiadiazol-3-yl phosphate
di(chlorophenyl) 1,2,5-thiadiazol-3-yl phosphate
divinyl 1,2,5-thiadiazol-3-yl phosphorothionate
dicyclopropyl 1,2,5-thiadiazol-3-yl phosphorothionate
diphenyl 1,2,5-thiadiazol-3-yl phosphorothionate
di(bromophenyl) 1,2,5-thiadiazol-3-yl phosphorothionate
diethyl 4-butyl-1,2,5-thiadiazol-3-yl phosphate
diethyl 4-vinyl-1,2,5-thiadiazol-3-yl phosphate
diethyl 4-phenyl-1,2,5-thiadiazol-3-yl phosphate
diethyl 4-cyclohexyl-1,2,5-thiadiazol-3-yl phosphate
diethyl 4-dimethylamino-1,2,5-thiadiazol-3-yl phosphate
diethyl 4-nitro-1,2,5-thiadiazol-3-yl phosphate
diethyl 4-bromo-1,2,5-thiadiazol-3-yl phosphate
diethyl 4-ethoxycarbonyl-1,2,5-thiadiazol-3-yl phosphate
diethyl 4-propionyl-1,2,5-thiadiazol-3-yl phosphate
diethyl 4-butoxy-1,2,5-thiadiazol-3-yl phosphate
diethyl 4-thiocyano-1,2,5-thiadiazol-3-yl phosphate
methyl 1,2,5-thiadiazol-3-yl ethanephosphonate
ethyl 1,2,5-thiadiazol-3-yl pentanephosphonate
cyclohexyl 1,2,5-thiadiazol-3-yl butanephosphonothionate
phenyl 1,2,5-4-ethoxy-1,2,5-thiadiazol-3-yl ethanephosphonothionate In the following examples the preparation of typical compounds utilizable in the method of this invention are demonstrated.

EXAMPLE 1

Diethyl 1,2,5-thiadiazol-3-yl phosphate

An aqueous solution (15 ml.) of potassium carbonate (4.8 g., 35 mmole) was added to 3-hydroxy-1,2,5-thiadiazole (7.0 g., 69 mmole) slurried in benzene (250 ml.). The water was removed as the azeotrope and collected in a Dean-Stark trap. Diethylphosphorochloridate (10.9 g., 62 mmole) was then added and the reaction mixture refluxed 16 hours. The consumption of diethylphosphorochloridate was confirmed by vapor phase chromatography. The cooled reaction mixture was filtered, washed twice with water (100 ml.) and dried over sodium sulfate. Evaporation of the solvent yielded 1,2,5-thiadiazol-3-yl diethyl phosphate, a pale yellow oil (8.3 g.). The structure was supported by its NMR spectrum (neat), exhibiting multiplets centered at $\delta$ 1.12 (6H) and $\delta$ 4.10 (4H) and a sharp singlet at $\delta$ 8.35 (1H).

EXAMPLE 2

Diethyl 4-cyano-1,2,5-thiadiazol-3-yl-phosphate

The procedure of Rose and Smith [J. M. Ross and W. C. Smith, J. Org. Chem., 86, 2861 (1964)] was used to prepare the potassium salt of 4-cyano-3-hydroxy-1,2,5-thiadiazole. The potassium salt (10 g., 61 mmole) was slurried in benzene (250 ml.), and dried by azeotropic distillation. Diethylphosphorochloridate (8.6 g., 50 mmole) was then added and the reaction mixture refluxed three days. The consumption of diethylphosphorochloridate was confirmed by vapor phase chromatography. The cooled reaction mixture was filtered, washed with water, (100 ml.) and dried over sodium sulfate. Evaporation of the solvent yielded 4-cyano-1,2,5-thiadiazol-3-yl diethyl phosphate, a red oil (5.5 g.). The structure was supported by its NMR spectrum (CDCl$_3$), exhibiting multiplets at $\delta$ 1.42 (6H) $\delta$ 4.20 (4H).

EXAMPLES 3 THROUGH 14

Using the following procedure, other phosphates and phosphorothionates were prepared. The compounds so prepared are set forth in Table I.

Phosphates (X=O)

The 4-substituted - 3 - hydroxy - 1,2,5 - thiadiazole (100 mmole) was added to a freshly prepared solution of sodium methoxide (100 mmole) in 250 ml. methanol. The methanol was evaporated and the resulting sodium salt slurried in 250 ml. benzene. The appropriate dialkyl phosphorochloridate (90 mmole) was added and the reaction mixture refluxed until the disappearance of dialkyl phosphorochloridate, monitored by vapor phase chromatography, was complete. The resulting heterogeneous mixture was cooled, filtered, and the benzene solution washed with three 100 ml. portions of water and dried over Na$_2$SO$_4$. Evaporation of solvent yielded the products as light oils. The NMR spectra support the assigned structures.

Phosphorothionates (X=S)

The 4 - substituted - 3 - hydroxy-1,2,5-thiadiazole (100 mmole) was added to a freshly prepared solution of sodium methoxide (100 mmole) in 250 ml. methanol. The methanol was evaporated and the resulting salt slurried in 250 ml. acetonitrile. The appropriate dialkyl phosphorochloridothionate (90 mmole) was added and the reaction mixture refluxed until the disappearance of dialkyl phosphorochloridothionate, monitored by vapor phase chromatography, was complete. The resulting heterogeneous mixture was cooled, filtered, and the acetonitrile evaporated. The resulting residue was dissolved in 250 ml. portions of water and dried over $Na_2SO_4$. Evaporation of solvent yielded the products as light oils. The NMR spectra support the assigned structures.

TABLE I

| Examples | Compounds |
|---|---|
| 3 | Dimethyl 1,2,5-thiadiazol-3-yl phosphate |
| 4 | Dimethyl 1,2,5-thiadiazol-3-yl phosphorothionate |
| 5 | Diethyl 1,2,5-thiadiazol-3-yl phosphorothionate |
| 6 | Dimethyl 4-ethoxy-1,2,5-thiadiazol-3-yl phosphate |
| 7 | Diethyl 4-ethoxy-1,2,5-thiadiazol-3-yl phosphate |
| 8 | Dimethyl 4-ethoxy-1,2,5-thiadiazol-3-yl phosphorothionate |
| 9 | Dimethyl 4-chloro-1,2,5-thiadiazol-3-yl phosphate |
| 10 | Diethyl 4-chloro-1,2,5-thiadiazol-3-yl phosphate |
| 11 | Dimethyl 4-ethylthio-1,2,5-thiadiazol-3-yl phosphate |
| 12 | Diethyl 4-ethylthio-1,2,5-thiadiazol-3-yl phosphate |
| 13 | Dimethyl 4-ethylthio-1,2,5-thiadiazol-3-yl phosphorothionate |
| 14 | Diethyl 4-ethylthio-1,2,5-thiadiazol-3-yl phosphorothionate |

Cotton defoliation spray test

This test is carried out using two groups of four plants, each of cotton seedlings. Seedlings in Group 1 had one immature true leaf per plant and seedlings in Group 2 had two immature true leaves. A solution of test material is sprayed over the seedlings to provide a rate of application equivalent to one pound active ingredient per acre in a volume of 24 gallons per acre. Eight days after treatment, the plants are observed for the percent defoliation of true leaves.

EXAMPLE 15

A solution consisting of 10.43 mg. of the compound of Example 3 in 2.1 water was applied to cotton seedlings in the aforedescribed defoliation test. The plants of Group 1 showed 100 percent defoliation of true leaves and those in Group 2 showed 87 percent defoliation.

EXAMPLE 16

A two pound per gallon emulsifiable concentrate formulation was prepared containing, by weight, 22.1 percent of the compound of Example 3, 69.2 percent an alkyl aryl polyether alcohol (Triton X 155) surfactant, and 8.7 percent xylene. A solution consisting of 47.2 mg. of the emulsifiable concentrate in 2.1 ml. water was sprayed over cotton seedlings in the aforedescribed cotton defoliation test. 100 percent defoliation of true leaves was obtained in the Group 1 plants and 87 percent defoliation was obtained in Group 2 plants.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for defoliating cotton plants which comprises applying thereto, in an amount sufficient to effect defoliation a compound having the formula:

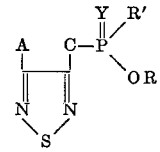

wherein Y is oxygen, R is alkyl ($C_1$–$C_5$), R' is alkoxy ($C_1$–$C_5$), and A is hydrogen.

2. The process of claim 1, wherein said compound is dimethyl 1,2,5-thiadiazol-3-yl phosphate.

References Cited
UNITED STATES PATENTS 3,666,768  5/1972  Baker et al. _____ 260—302 E
3,666,435  5/1972  Price et al. _____ 71—87

LEWIS GOTTS, Primary Examiner

U.S. Cl. X.R.

71—87; 260—302 D